United States Patent [19]

Freure et al.

[11] 3,723,525

[45] Mar. 27, 1973

[54] 2,4,'-DIAMINO DICYCLOHENZ

[75] Inventors: Robert J. Freure, Clarkson, Ontario; Maurice Moyle, Oakville, Ontario, both of Canada

[73] Assignee: Gulf Oil Canada Limited, Toronto, Ontario, Canada

[22] Filed: Nov. 12, 1970

[21] Appl. No.: 89,053

Related U.S. Application Data

[60] Division of Ser. No. 839,665, July 7, 1969, abandoned.

[52] U.S. Cl..................260/563 R, 260/77.5 AM
[51] Int. Cl.................................C07c 87/36
[58] Field of Search.....260/563 R, 563 PA, 563 CM, 260/563 D

[56] References Cited

UNITED STATES PATENTS 3,283,002  10/1966  Brake ..............................260/563 R 2,606,925  8/1952  Whitman ..........................260/563 R

OTHER PUBLICATIONS

Tomilinson et al., J. Chem. Soc., 1965, 603–609
Smith, "Open–Chain Nitrogen Compounds", I, 115 (1965) QD 412 N 156

*Primary Examiner*—Lewis Gotts
*Assistant Examiner*—D. R. Phillips
*Attorney*—Michael I. Stewart

[57]  ABSTRACT

A novel dicyclohexyl diamine is provided. A sequence of steps is disclosed whereby the novel diamine may be formed from diphenyl.

1 Claim, No Drawings

2,4,'-DIAMINO DICYCLOHENZ

This application is a division of U. S. application Ser. No. 839,665 filed July 7, 1969 now abandoned.

This invention relates to a certain novel amine.

The present invention provides a novel compound of the formula:

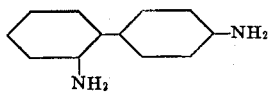

Amino compounds generally are formed by reduction of the corresponding nitro compound, although the amino compound could be prepared by other methods known in the art. The nitro compound itself is generally obtained from the corresponding hydrocarbon by nitration.

A suitable starting material for the production of the novel diamine of the invention is diphenyl. Diphenyl is a major constituent of the by-products formed in the dealkylation of toluene to form benzene. It therefore is cheap and readily available.

One procedure for the production of the novel amine of the present invention from diphenyl is outlined below:

I.

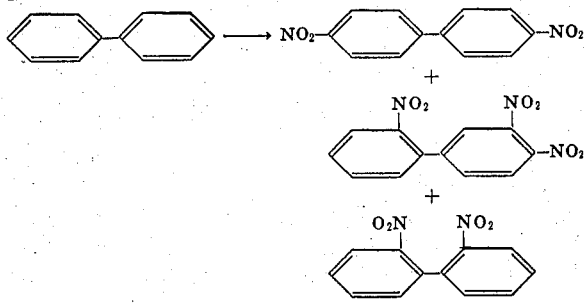

The first step thus involves the preparation of a mixture of 4,4' -, 2,4' - and 2,2' - dinitrodiphenyls. This is accomplished generally in two stages, forming first a mixed mononitro product, nitrated in the 2- and 4-positions, and secondly, the mixed dinitro product by using more vigorous nitration conditions. The 4,4' -dinitro compound is the least soluble of the isomeric dinitrodiphenyls and under certain conditions, for example, nitration of diphenyl in a relatively large excess of 80 percent nitric acid may be obtained free of the other isomers and treated separately. The 2,2' - and 2,4' -isomers may be separated from the 4,4' -isomer by fractional crystallization. The 2,2'- and 2,4'- isomers then are separated from each other.

In an alternative procedure, the starting material is 4-nitrodiphenyl available as a commercial material produced by nitration of diphenyl under controlled conditions. Nitration of this material produces a high proportion of the 4,4' -dinitrodiphenyl, along with some 2,4' -dinitrodiphenyl. The 2,4' -dinitrodiphenyl then is separated from 4,4' -isomers.

II.

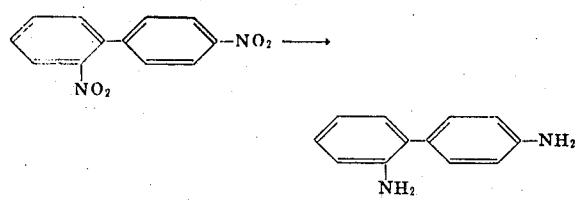

The second step involves the reduction of the 2,4' -di-nitrodiphenyl to the corresponding diaminodiphenyl. This reduction may be carried out in a variety of ways. The preferred method involves catalytic hydrogenation in a suitable solvent.

III.

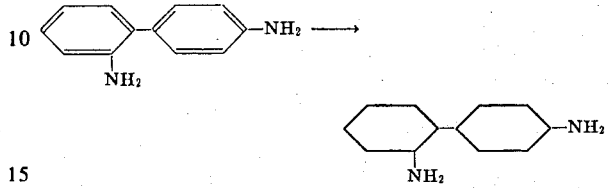

The third step involves reduction of 2,4' -diaminodiphenyl to the novel 2,4' -diaminodicyclohexyl and may be carried out in the presence of ammonia as a means of reducing possible side reactions. The preferred reduction is carried out by catalytic hydrogenation in the presence of a noble metal catalyst such as ruthenium, ruthenium oxide, platinum or rhodium or modified noble metal catalyst such as an oxide.

The diamino compound of the invention may be used to cross-link polyurethanes formed in well-known manner by the reaction of a polyfunctional isocyanate and a polyfunctional active hydrogen containing compound.

The invention is illustrated by the following Examples:

Example I

About 1500 parts by volume of 70 percent nitric acid was heated to about 65°C and about 154 parts by volume of diphenyl added. No reaction was observed until the temperature reached about 90°C at which stage a vigorous reaction of short duration set in, the temperature rising to about 115°C. After about 2 minutes the temperature was raised to about 125°C during about 10 minutes then allowed to cool. The mixture was poured into ice/water, the product collected by filtration, washed thoroughly with water and dried to constant weight. The yield of product was about 242 parts by weight or 99 percent of isomeric dinitrodiphenyls and the isomeric distribution, determined by gas chromatographic analysis, was about 13 percent of 2,2'-, and about 53 percent of 2,4'- and about 33 percent of 4,4' -dinitrodiphenyl.

Pure 4,4' -dinitrodiphenyl, melting point 234°–237 °C, pure 2,4' -dinitrodiphenyl, melting point 93°–95°C, and pure 2,2'-dinitrodiphenyl, melting point 126°–128 °C were obtained by fractional crystallization of the mixed isomers.

Example 2

A suspension of about 122 parts by weight of 2,4' -dinitro-diphenyl and 2 parts by weight of 5 percent palladium on charcoal in about 500 parts by volume of isopropanol was hydrogenated at about 85°C and about 2 atmospheres pressure until uptake of hydrogen ceased. The catalyst was separated from the clear solution by filtration and the solvent evaporated under reduced pressure giving a yield of about 90 parts by weight (98 percent) of the known 2,4' -diaminodiphenyl which readily crystallized on cooling.

Example 3

A suspension of about 184 parts by weight of 2,4'-diaminodiphenyl and about 25 parts by weight of 5 percent ruthenium on alumina in about 750 parts by volume of iso-propanol which had previously been saturated at about 20°C with anhydrous ammonia was hydrogenated at about 135°C and a pressure of about 3000 p.s.i. Uptake of hydrogen ceased after about 3 hours. On cooling the catalyst was separated by filtration, the solvent evaporated under reduced pressure and the product flash distilled at about 200°C and about 0.1 mm. Hg. The total product, about 180 parts by weight, had a neutralization equivalent of 102. Fractionation through a short column gave a small fore-run then about 165 parts by weight of pure 2,4'-dicyclohexyl diamine, boiling point about 135°C/0.1 mm. Hg. and neutralization equivalent 98. Analysis of the product gave the following results:

Calculated for $C_{12}H_{24}N_2$: C, 73.40; H, 12.40; N, 14.30
Found: C, 73.67; H, 12.39; N, 14.31.

What we claim is:

1. The compound of the formula:

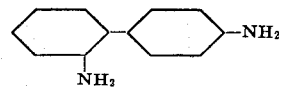

* * * * *